United States Patent [19]

Usui

[11] Patent Number: 5,853,902
[45] Date of Patent: Dec. 29, 1998

[54] METAL HONEYCOMB CORE BODY

[75] Inventor: Masayoshi Usui, Shizukoa, Japan

[73] Assignee: Usui Kokusai Sangyo Kaisha, Ltd., Shizuoka, Japan

[21] Appl. No.: 849,481

[22] PCT Filed: Dec. 1, 1995

[86] PCT No.: PCT/JP95/02455

§ 371 Date: Jun. 2, 1997

§ 102(e) Date: Jun. 2, 1997

[87] PCT Pub. No.: WO96/16735

PCT Pub. Date: Jun. 6, 1996

[30] Foreign Application Priority Data

Dec. 2, 1994 [JP] Japan ..................... 6-324022

[51] Int. Cl.⁶ .......... B21D 39/00; B23B 15/00; B21C 37/00; B01J 21/04
[52] U.S. Cl. .......... 428/593; 428/594; 428/603; 428/604; 428/595; 502/439; 502/527
[58] Field of Search .................. 428/593, 594, 428/603, 604, 595; 502/439, 527

[56] References Cited

U.S. PATENT DOCUMENTS

| | | | |
|---|---|---|---|
| 4,987,034 | 1/1991 | Hitachi et al. | 428/593 |
| 5,045,403 | 9/1991 | Maus et al. | 428/593 |
| 5,084,361 | 1/1992 | Toyoda et al. | 428/593 |
| 5,270,095 | 12/1993 | Ito et al. | 428/116 |

FOREIGN PATENT DOCUMENTS

| | | |
|---|---|---|
| 3-56146 | 7/1989 | Japan . |
| 1-218637 | 8/1989 | Japan . |
| 1-163436 | 11/1989 | Japan . |
| 2-102744 | 4/1990 | Japan . |
| 2-218442 | 8/1990 | Japan . |
| 2-233123 | 9/1990 | Japan . |
| 4-103819 | 4/1992 | Japan . |
| 4-81635 | 7/1992 | Japan . |
| 5-253493 | 10/1993 | Japan . |
| 6-63420 | 3/1994 | Japan . |
| 6-246170 | 9/1994 | Japan . |
| 6-299844 | 10/1994 | Japan . |
| 7-39765 | 2/1995 | Japan . |

*Primary Examiner*—Paul J. Thibodeau
*Assistant Examiner*—Holly C. Rickman
*Attorney, Agent, or Firm*—McDermott, Will & Emery

[57] ABSTRACT

A metal support for exhaust gas cleaning has a metal honeycomb core body fabricated by laying a planar sheet on a corrugated sheet and rolling the laminated sheets into a cylindrical configuration. The corrugated sheet has sinusoidal shaped portions having a wave height which is sufficient to contact the adjacent planar sheet and square wave portions which have a wave height which is insufficient to enable contact with the adjacent sheets. The square wave portions have corners which project out beyond the sinusoidal shaped portions and produce agitation and disturb the flow of gas and to induce an increase in the contact efficiency between the gas and surfaces carrying catalytic material. The planar sheet is not limited to continuously flat sheets and can include flat surfaces formed by zigzag or square wave shaped members. These members can be perforate and or made of a mesh material.

19 Claims, 15 Drawing Sheets

METAL HONEYCOMB CORE BODY

BACKGROUND OF THE INVENTION

1. Field of the Invention

This invention relates to a metal honeycomb core body having honeycomb structure that is the principal structural element of an exhaust gas cleaning metal carrier which is generally installed at an intermediate point of an exhaust system of a motor vehicle and used as a cleaning means of exhaust gas.

More particularly, this invention relates to a new structure of the above-mentioned metal honeycomb core body for a metal carrier for exhaust gas cleaning comprising a metal honeycomb comprising honeycomb structure for carrying exhaust gas cleaning catalyst and a metal-made casing for containing the metal honeycomb core body.

2. Description of Related Art

A conventional metal carrier for exhaust gas cleaning comprises a metal-made metal honeycomb core body for carrying exhaust gas cleaning catalyst (for example catalyst using Pt, Rh, or Pd) composed of planar band member and corrugated band member with corrugated structure (simply referred to as metal honeycomb core body) and a metal-made casing for containing and fixing the metal honeycomb core body therein (simply referred to as metal casing).

The above-mentioned metal carrier is referred to as metal support or metal substrate in the industry, and generally denoted by the abbreviation MS. In the description of the present invention, the above-mentioned abbreviation MS will be used.

Metal honeycomb core body is denoted by H in connection with the discussion of the embodiments of the invention while (H') is used in connection with the discussion of the conventional prior art arrangements. For convenience, both denotations are used in FIG. 1 which shows a configuration generally common to both.

For a metal-made casing, an abbreviation (C) is used in association with casing.

Various honeycomb structures have been proposed as the metal honeycomb core body (H') which is the principal element of the above-mentioned metal support (MS).

For example, a metal honeycomb core body having honeycomb structure (H) shown in FIG. 2, which will be described hereinafter for description of the present invention, is a metal honeycomb core body which is referred as rolling type.

As described hereinafter, a rolling type metal honeycomb core body (H) in accordance with the present invention is quite different from the conventional metal honeycomb core body (H') having the same structure (rolling type) in quality.

However, a metal honeycomb core body (H) of the present invention relates to a new improvement of various metal honeycomb core bodies (H') which have been proposed in the past including the above-mentioned conventional rolling type metal honeycomb core body. In the context of metal honeycomb core body improvement, these various metal honeycomb core bodies (H') which have been proposed in the past are outlined herein.

The above-mentioned conventional rolling type metal honeycomb core body (H') is fabricated by superposing, for example, a planar band member comprising a heat-resistant thin-walled steel sheet with a thickness of 100 $\mu$m or thinner (preferably 50 $\mu$m or thinner) and with a desired width on a corrugated band member formed by corrugating the above-mentioned planar band member one over the other in a contiguous relationship, and then by rolling the thus-superposed band members together to form a metal honeycomb core body (H') having honeycomb structure comprising a number of network-patterned axial vent holes (cells) for exhaust gas passages.

Metal honeycomb core bodies having various structures other than the above-mentioned rolling type metal honeycomb core body are known as the metal honeycomb core body proposed in the art, these metal honeycomb core bodies are different in the method for fabrication of the metal honeycomb core body from a planar band member and corrugated band member.

For example, a metal honeycomb core body of multilayered type which is formed by laying both bands alternately (refer to FIG. 18 described hereinafter) has been known. In addition, metal honeycomb core bodies of radial type (refer to FIG. 25 described hereinafter), S-shaped type (refer to FIG. 26 described hereinafter), conjugated-comma type (refer to FIG. 27 described hereinafter), and X-lap type (refer to FIG. 28 described hereinafter) have been known.

A conventional typical metal support (MS) for exhaust gas cleaning comprises a metal honeycomb core body (H') having the above-mentioned honeycomb structure, which is the principal element thereof, accommodated in a metal-made casing (C).

Because a metal support (MS) is used under a severe high temperature condition in exhaust gas system, the above-mentioned metal honeycomb core body (H') is firmly joined to metal-made casing (C) in the fabrication process.

The metal honeycomb core body (H') and metal casing (C) are subjected to the high temperature due to exhaust gas itself and another high temperature due to exothermic reactions between exhaust gas and the cleaning catalyst, and subjected to serious thermal stress in such high temperature, both components (metal honeycomb core body and metal-made casing) are therefore firmly jointed together at contacts therebetween by a suitable method such as welding or brazing.

From the view point of preventing the separation between both components at the contact area between a metal honeycomb core body (H') and metal-made casing (C), a joining method in which contact areas are joined at a specified position has been proposed.

On the other hand, from the view point of ensuring the durability under the above-mentioned severe service condition, the contact area between a planar band member and corrugated band member which are components of the metal honeycomb core body (H') itself is firmly joined by various joining methods and formulas. For example, the contact area between a planar band member and corrugated band member is joined by a joining method such as welding and brazing.

As described hereinbefore, a conventional metal support (MS) for exhaust gas cleaning is manufactured by applying a joining method such as welding or brazing for joining between components (planar band member and corrugated band member) of a metal honeycomb core body (H') which is the principal element thereof and for joining between the metal honeycomb core body (H') and a metal casing (C).

From the view point of the high productivity and ensured joining, brazing method is generally employed as the above-mentioned joining method.

Various joining methods for joining a metal honeycomb core body (H') (joining between components of the metal honeycomb core body) for improved durability of the metal support (MS) as described hereinbefore and for joining a contact area between the metal honeycomb core body (H') and metal-made casing (C) have been proposed, however, these methods are not sufficient from the view point of long term durability.

In the fabrication process of metal supports brazing method is widely employed as joining method as described hereinbefore, and expensive high temperature-use brazing filler metals such as Ni-based and Ni—Cr-based brazing filler metal have been used as the brazing filler metal used for the above-mentioned joining method in view of the high temperature environmental condition under which a metal support is used. From the economic view point, efforts have been addressed on the reduction of brazing filler metal use, but the reduction is not sufficient yet.

Further, in a metal honeycomb core body (H') joined by conventional brazing method, because fillets are formed at the contact areas between the planer band member and corrugated band member which are components thereof, the area which is available for forming catalyst coating layer decreases, and 20% to 30% of the total surface area of both band members does not contribute to exhaust gas cleaning, this decrease is a serious disadvantage of the conventional brazing method.

SUMMARY OF THE INVENTION

The present invention was accomplished to solve the problem of the above-mentioned conventional technique.

The inventors of the present invention has conducted various investigations to solve the problem of the conventional technique in terms of the first aspect of the method for improving durability of a metal support (MS) and in terms of the second aspect of the method for developing a metal support excellent in economy.

As a result, it has been found extremely effective for the great improvement in the durability of a metal support (MS) for exhaust gas cleaning to substitute the conventional metal honeycomb core body (H') which is the principal element of a metal support (MS) for a different metal honeycomb core body having a novel structure, particularly to employ a corrugated band member having a novel waveform structure instead of the corrugated band member having a simple structure which is a component of the conventional metal honeycomb core body (H').

In detail, it has been found extremely effective to employ a corrugated member having waveform structure that at least the area of one end and near the end is mainly in contact with a planar band member and other portions are not in contact with the planar band member or other portions are in contact with the planar band member at only limited area in the view of the axial direction of the metal honeycomb core body (in view of the inflow-outflow direction) as the corrugated member.

Further, it has been found that catalyst quantity carried per unit volume is increased and consumption of expensive brazing filler metal for high temperature is reduced by using the above-mentioned corrugated member having the above-mentioned particular structure.

The present invention was accomplished based on the above-mentioned findings, and provides a metal honeycomb core body (H) excellent in durability (high temperature fatigue resistant) as well as economical efficiency which is the principal element of a metal support (MS) for exhaust gas cleaning.

In the outline of the present invention, the first aspect of the present invention relates to a metal honeycomb core body fabricated by placing a planar member and corrugated member made of heat-resistant metal sheet alternately one over the other which is used for carrying exhaust gas cleaning catalyst, wherein the metal honeycomb core body is provided with the corrugated member having, in the view of the axial direction of the metal honeycomb core body (inflow and outflow direction of exhaust gas), (1) a structure having a wave height for contact the planar member at least at the area of one end and near the end thereof, and having the wave form with the wave form structure of approximate sine wave form, and (2) another structure having a wave height for noncontact with the planar member in the area other than the above-mentioned area, and having the wave form with the wave form structure of rectangular wave form.

Further, the second aspect of the present invention relates to a metal honeycomb core body fabricated by placing a planar member and corrugated member made of heat-resistant metal sheet alternately one over the other which is used for carrying exhaust gas cleaning catalyst, the metal honeycomb core body provided with the corrugated member having, in the view of the axial direction of the metal honeycomb core body (inflow and outflow direction of exhaust gas), (3) a structure having a wave height for contact the planar member at least at the area of one end and near the end thereof, and having the wave form with the wave form structure of approximate sine wave form, and (4) another structure having a wave height for noncontact with the planar member in the larger area other than the above-mentioned area and for contact with the planar member in the smaller area, and having the wave form with the wave form structure of rectangular wave form.

In a metal honeycomb core body (H) which is the principal element of a metal support (MS) of the present invention, the corrugated member which is a component of the metal honeycomb core body (H) has, in the view of the axial direction of the metal honeycomb core body (H) (inflow and outflow direction of exhaust gas), (1) a structure having a wave height for contact the planar member at least at the area of one end and near the end thereof, and having the wave form with the wave form structure of approximate sine wave form, and (2) another structure having a wave height for noncontact with the planar member in the area other than the above-mentioned area, and having a wave form with the wave from structure of rectangular wave form, or yet another structure having a wave height for noncontact with the planar member in the larger area and for contact with the planar member at the smaller area, and having a wave form with the wave form structure of rectangular wave form.

Next, embodiments of various combinations of the corrugated member having the above-mentioned particular structure and the planar member are described in detail.

(a) In the case that the corrugated member has a structure having a wave height for contact with the planar member at least in the area of one end and near the end, and having a wave form with the wave form structure of approximate sine wave form, and another structure having a wave height for noncontact with the planar member in the area other than the above-mentioned area, and having a wave form with the wave form structure of rectangular wave form:

The planar member to be combined with the above-mentioned corrugated member is;

(a-1) a planar member comprising a member having a width approximately equal to the width of the corrugated member in the view of the axial direction of the metal honeycomb core body, or (a-2) a planar member comprising a strip member having a width approximately equal to the width of the portion of the corrugated member in contact with the planar member (at least the area of one end and near the end).

(b) In the case that the corrugated member has;

a structure having a wave height for contact with the planar member at least in the area of one end and near the end, and having a wave form with the wave form structure of approximate sine wave form, and another structure having a wave height for noncontact with the planar member in the area at least other than the area of one end and near the end thereof, and having a wave form with the wave form structure of rectangular wave form, and additionally having a wave height for contact with the planar member at the small area and having a wave form of the wave form structure of approximate sine wave form.

The planar member to be combined with the corrugated band member is;

(b-1) a planar member comprising a member having a width approximately equal to the width of the corrugated member in the view of the axial direction of the metal honeycomb core body, or (b-2) a planar member comprising a strip member having a width approximately equal to the width of the portion of the corrugated band member in contact relationship with the planar member at least in the area of one end and near the end of the corrugated member in the view of the axial direction of the metal honeycomb core body, and a strip member having a width approximately equal to the width of the portion of the corrugated member in contact relationship with the planar band member in the area other than the above-mentioned area of the corrugated band member.

Next, the outline structure of the corrugated member and planar member having the above-mentioned particular wave form structure which are essential structural elements of the metal honeycomb core body (H) of the present invention will be described.

The corrugated member having the above-mentioned particular wave form structure of the present invention, in the contact and noncontact relationship between the other structural member (namely the planar member) as described herein above, has a wave form with the wave form structure of approximate sine wave at the area in contact with the planar member, and has a wave form with the wave form structure of rectangular wave form in the area in noncontact with the planar member, that is, the corrugated member is featured in that the corrugated member is specified to have both approximate sine wave form and rectangular wave form.

In the present invention, the term "approximate sine wave form" used hereinbefore includes the delta wave form (crest and trough of the wave form is triangular shaped).

The term "rectangular wave form" means the rectangular wave form that has the flat top and bottom.

The planar member of the present invention has a flat surface, and is not limited as long as the planar member can be in contact with the corrugated member having the above-mentioned particular structure.

For example, a simple flat planar sheet, a sheet having microwave structure (micro-corrugation) (in the present invention, the sheet of this sort is referred as a planar member), a flat sheet having holes (punching metal), expanded metal, and mesh sheet (wire mesh sheet) may be used.

Further, the planar member of the present invention may include, as described in the embodiment hereinafter (refer to FIG. 12), a planar member having the structure of successive arrangement of approximately regular triangles in the longitudinal direction (direction perpendicular to the axial direction of the metal honeycomb core body) in which two sides are coterminous for connection and the residual one side forms a top or bottom flat apical plate for connection.

The corrugated member having the above-mentioned particular wave form structure of the present invention is quite different essentially from the corrugated band member having the simple structure comprising only approximate sine wave form used for the conventional metal honeycomb core body (H').

The corrugated member having the above-mentioned particular wave form structure of the present invention is quite different essentially from the corrugated band member having cutoff portions formed with an interval at the top (crest and trough of a wave) in the view of the axial direction of the metal honeycomb core body (H') disclosed in JP 4-81635 (U).

In detail, the corrugated band member disclosed in JP 4-81635 (U) is prima facie (at first glance) similar to the corrugated member of the present invention because the corrugated band member disclosed in JP 4-1635 (U) has areas in contact (contact area) and noncontact (noncontact area) with the planar band member in the view of the axial direction of the metal honeycomb band member due to the existence of the above-mentioned cutoff. However, the corrugated band member disclosed in JP 4-81635 (U) is quite different from the corrugated member of the present invention because the wave form structure of the noncontact area is not the rectangular wave form. As described hereinafter, the corrugated member of the present invention exhibits excellent effect based on the contribution of the rectangular wave form in the noncontact area.

In the present invention, the metal honeycomb core body (H) which is the principal element of a metal support (MS) for exhaust gas cleaning is composed of the planar member (1) and the corrugated member (2) having a particular structure (having particular wave form).

In the present invention, a corrugated member having a particular structure which is the principal element of the metal honeycomb core body (H) is in contact with and fixed to a planar member, in detail, at least the area of one end and near the end of the corrugated member is in contact with and fixed to the planar member. On the other hand, in area other than the above-mentioned area, both members (corrugated member having particular structure and planar member) are in noncontact or in contact at only limited areas.

Further, the corrugated member of the present invention has a wave form structure of approximate sine wave form at the area for contact (contact area) with a planar member and has a wave form structure of rectangular wave form at the area for noncontact (noncontact area) with the planar member.

Because a metal honeycomb core body (H) of the present invention employs the above-mentioned corrugated member having particular structure, the metal honeycomb core body (H) exhibits the following excellent effects.

(1) The corrugated member of the present invention has both a portion having approximate sine wave form (the portion to be in contact with a planar member) and portion having rectangular wave form (the portion to be in noncontact with the planar member) in the view of the axial direction of the metal honeycomb core body (H).

Accordingly, the portion having rectangular wave form has portions projected from the wave surface of the approximate sine wave form in the view from the portion having the approximate sine wave form.

The above-mentioned projections are very favorable for mixing, agitating, and disturbing exhaust gas. In other words, the above-mentioned projections improves the contact efficiency between exhaust gas and carried catalyst to result in significant improvement of exhaust gas cleaning capability.

(2) In a corrugated member of the present invention, noncontact area between both members (a corrugated member having particular structure and planar member) in the view of the axial direction of the metal honeycomb core body (H) can be formed in a large proportion. By forming the above-mentioned noncontact area, following excellent effects are obtained;

(i) severe deformation force due to thermal stress generated in the metal honeycomb core body (H) is absorbed and relaxed effectively, and (ii) because of noncontact area between both members, the surface of both members are available for carrying catalyst effectively, and the quantity of carried catalyst per unit volume can be increased (attains high exhaust gas cleaning capability or minimization of the size or compact size of the metal honeycomb core body).

(iii) the exhaust gas agitation and flow disturbing effect brought about by the space formed in the noncontact area enhances the exhaust gas cleaning capability (lead to minimization of the metal honeycomb core body namely realization of the compact metal honeycomb core body), further the projections projected from the wave surface of the approximately regular sine wave form formed on the rectangular wave form more enhances the effect, (iv) the consumption of expensive sheet material for the metal honeycomb core body (H) (planar member and corrugated member) is significantly reduced in relation to the above-mentioned (ii) and (iii), and (v) the consumption of expensive high temperature brazing filler metal such as Ni-based brazing filler metal used for joining both corrugated sheets is reduced because of partial noncontact configuration between both members. (realize the metal honeycomb core body (H) exhibits excellent effects in economy)

DETAILED DESCRIPTION OF PREFERRED EMBODIMENTS

Figure 1:
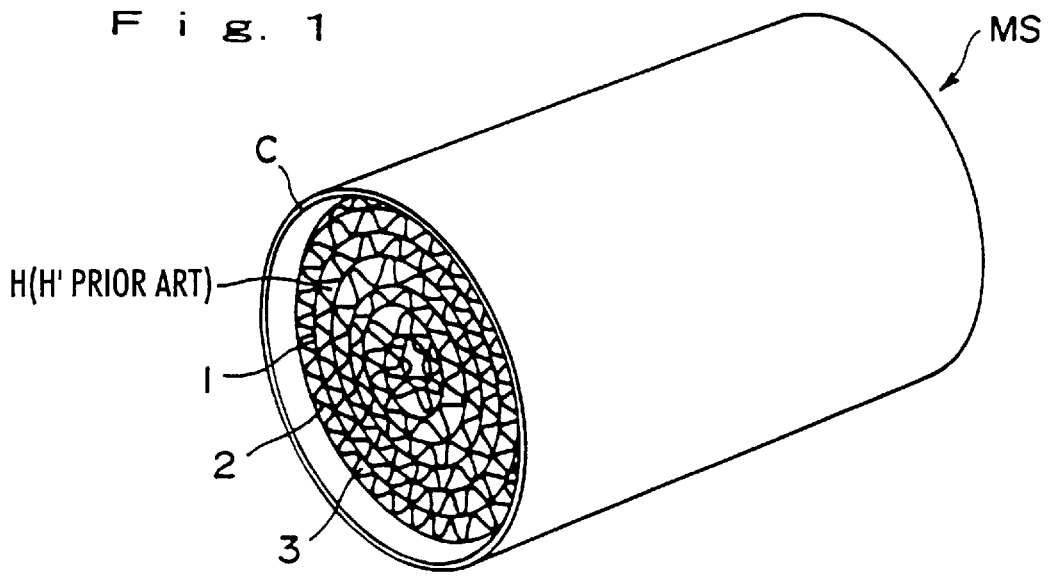
FIG. 1 is a perspective view of a metal support (MS) fabricated using a metal honeycomb core body (H) (rolling type) in accordance with the first embodiment of the present invention.

Technical structure and embodiments of the present invention will be described in detail hereinafter referring to the drawings.

Needless to say, this invention is by no means limited by the attached drawings.

FIG. 1 to FIG. 7 are figures for illustrating a metal honeycomb core body (H) according to the first embodiment of the present invention.

Figure 2:
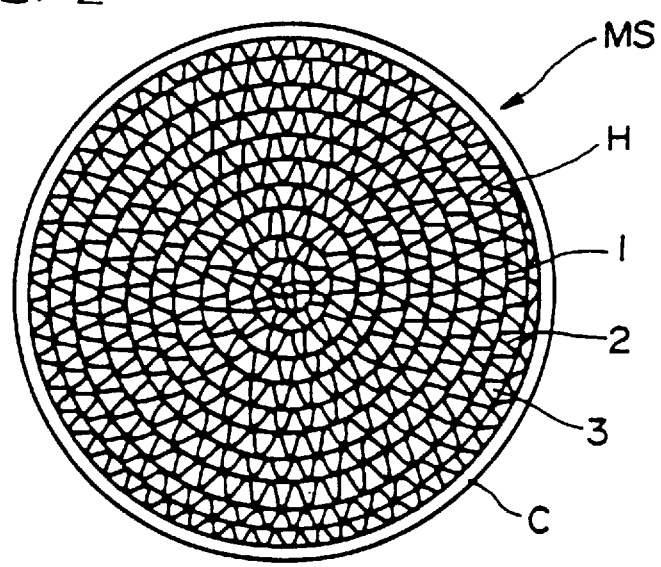
FIG. 2 is a front view of the metal support (MS) shown in FIG. 1.

FIG. 1 is a perspective view of a metal support (MS) manufactured using the metal honeycomb core body (H) in accordance with the first embodiment of the present invention, and FIG. 2 is a front view of the metal support (MS) shown in FIG. 1.

As shown in FIG. 1 and FIG. 2, the metal honeycomb core body (E) in accordance with the present invention is used as the principal element of a metal support (MS) for exhaust gas clearing, The structure of the metal honeycomb core body (H) shown in FIG. 1 and FIG. 2 is a rolling type honeycomb.

Figure 3:
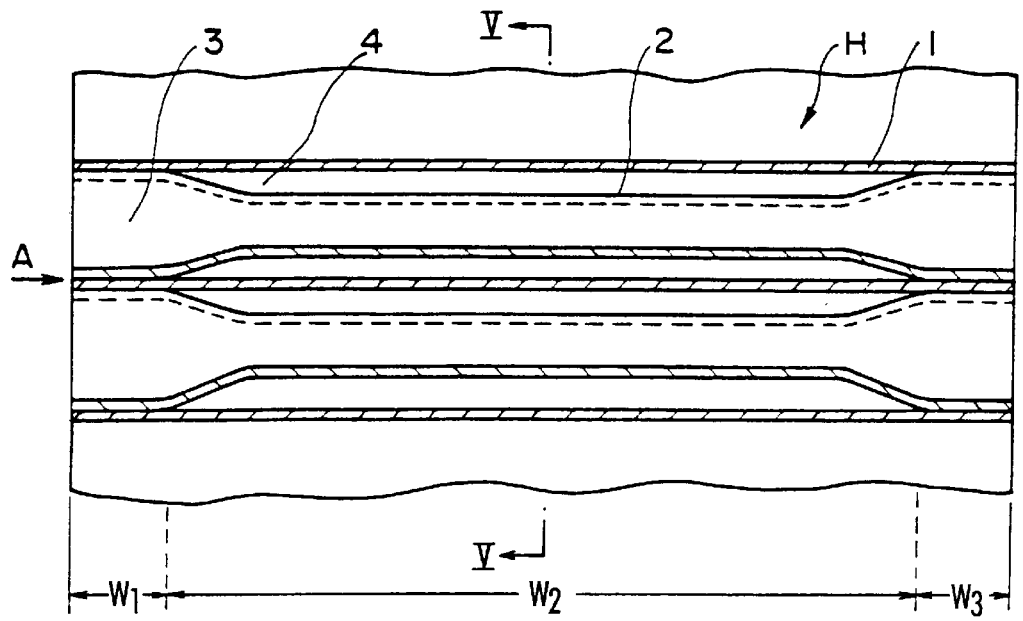
FIG. 3 is a partial cross-sectional view along the axial center of the metal honeycomb core body (H) in accordance with the first embodiment of the present invention.

FIG. 3 is a partial cross-sectional view along the axial center of the metal support (MS) shown in FIG. 1, and the diagram for illustrating the structure of the metal honeycomb core body (H) in accordance with the first embodiment of the present invention.

Figure 4:
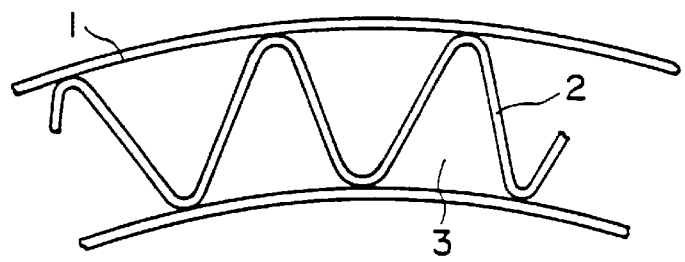
FIG. 4 is an A-line arrow view in FIG. 3.

FIG. 4 is an A-line arrow view of FIG. 3 (partial).

Figure 5:
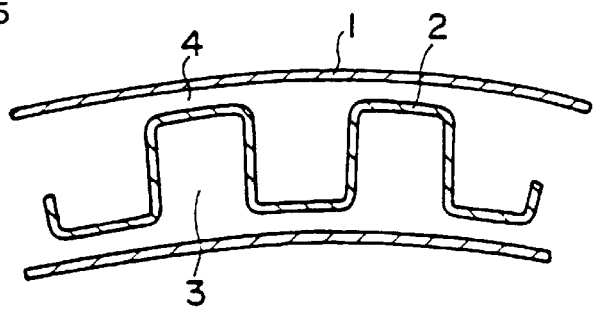
FIG. 5 is a cross-sectional view along the line B—B in FIG. 3.

FIG. 5 is a cross-sectional view along the line B—B (partial).

Figure 6:
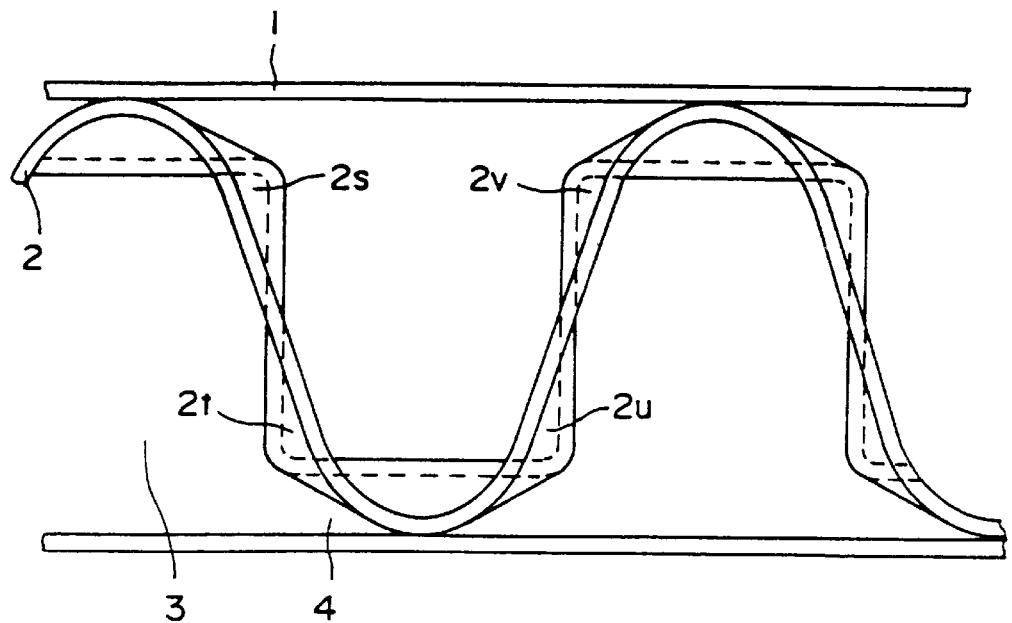
FIG. 6 is a partially enlarged view of the A-line arrow view in FIG. 3.

FIG. 6 is a partially enlarged cross-sectional view of the A-line arrow view shown in FIG. 3. FIG. 6 is a view corresponding to a detailed drawing of FIG. 4.

Figure 7:
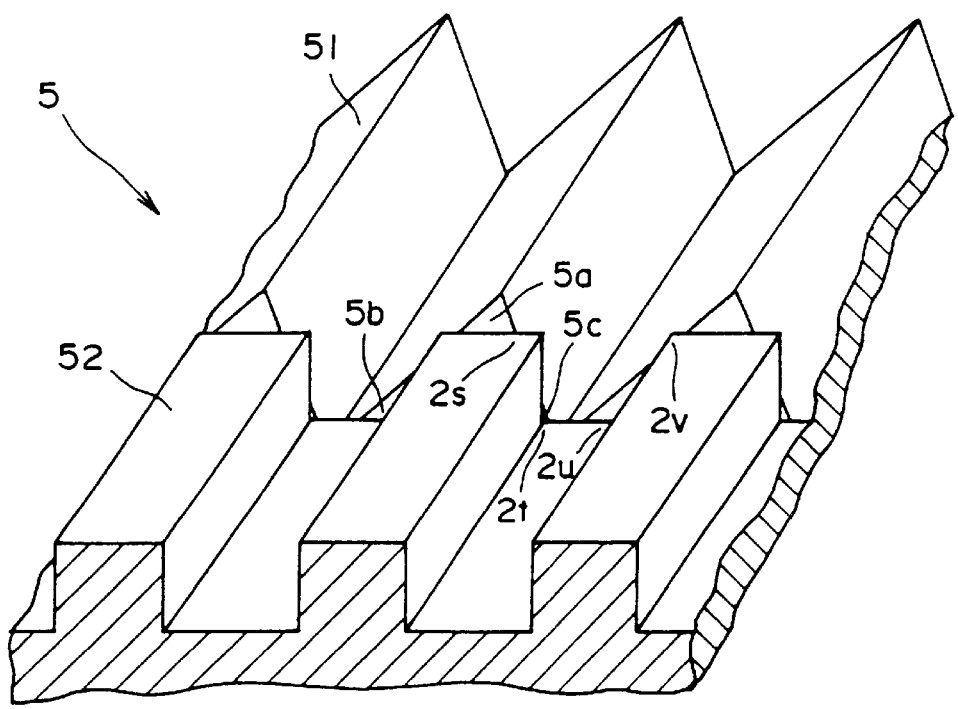
FIG. 7 is a partial perspective view of a forming gear machine for manufacturing corrugated members (2) which are a component of a metal honeycomb core body in accordance with the first embodiment of the present invention.

FIG. 7 is a partial perspective view of a forming gear (corrugating gear) (5) for manufacturing corrugated members which are a component of a metal honeycomb,core body (H).

As shown in the figures (refer to FIG. 3 to FIG. 6), the metal honeycomb core body (H) in accordance with the first embodiment of the present invention composed of planar members (1) and corrugated members (2) is featured by the structure of the corrugated member (2).

The first feature of the corrugated member (2) used for the metal honeycomb core body (H) in accordance with the first embodiment of the present invention specified in terms of contact and noncontact with the planar member (1) has, as shown in FIG. 3 to FIG. 5 viewing from the axial center direction of the metal honeycomb core body (H);

(1) the structure comprising a sine-wave-formed member having a wave-height for ensuring contact with the planar member (1) at the area of both ends and near the ends namely areas $W_1$ and $W_3$ in FIG. 3 (refer to FIG. 3 and FIG. 4, and (2) the structure comprising a rectangular-wave-formed member having a wave height for ensuring noncontact with the planar member (1) in the area other than the above-mentioned area namely area ($W_2$) in FIG. 3 (refer to FIG. 3 and FIG. 5)

The above-mentioned areas $W_1$, $W_2$, and $W_3$ have widths indicated by each character respectively.

The second feature of the corrugated member (2) used for the metal honeycomb core body (H) in accordance with the first embodiment of the present invention is, as shown in FIG. 5 and FIG. 6, represented by the rectangular wave form structure of noncontact area ($W_2$) which is not in contact with the planar member (1) as shown in FIG. 5 and FIG. 6.

In the metal honeycomb core body (H) of the present invention, the advantage of structure of the corrugated member (2) having rectangular wave form in the above-mentioned noncontact area ($W_2$) is shown in FIG. 6.

As described herein above, corrugated member (2) which is a component of the metal honeycomb core body (H) of the present invention has both sine-wave-formed portion and rectangular-wave-formed portion in the axial view of the metal honeycomb core body (H). In the rectangular-wave-formed portion, as shown in FIG. 6, portions (2s, 2t, 2u, and 2v) which project from the wave surface of approximate sine wave form are formed in the view from the portion of approximate sine wave.

The above-mentioned projections (2s, 2t, 2u, and 2v) on the rectangular wave form serves to efficiently disturb exhaust gas flow. In other words, the projections (2s, 2t, 2u, and 2v) is useful to improve the contact efficiency between exhaust gas and carried catalyst and enhance the exhaust gas cleaning efficiency.

The present invention and the above-mentioned Jp 4-41635 (U) are similar each other in the point that both contact area and noncontact area with a planar band are formed. However, the technical concept that rectangular wave form is adopted as the wave form structure of non-contact area is not included in the above-mentioned JP 4-81635 (U), the JP 4-81635 (U) will not exhibits the above-mentioned effect.

In the present invention, the proportion of noncontact area of both members (1 and 2) may be prescribed in consideration of effects to be attained by noncontact relationship of both members (1 and 2), in detail;

the improving effect of absorption and relaxation capability of deformation force due to significant thermal stress generated in the internal of the metal honeycomb core body (H), the mixing, agitating, and disturbing effect (improving effect of exhaust gas cleaning capability) of exhaust gas in noncontact area ($W_2$) of both members (1 and 2), the effect for increasing the efficient use of the surface of both members for serving the area for carrying exhaust gas cleaning catalyst (to say from other side, effect for reducing the use of both members), the effect for increasing the catalyst carrying capacity (comparing with the conventional structure of contact area), and the effect for reducing the use of expensive high temperature brazing filler metal applied to contact areas ($W_1$ and $W_3$).

As shown in FIG. 3 and FIG. 5, a space (4) is formed depending on the noncontact relationship between both members (1 and 2), the space has important significance to attain the above-mentioned effects.

The effect of mixing, agitating, and disturbing exhaust gas in the space (4) is greatly improved by the existence of rectangular-wave-formed portion of the corrugated member (2), in particular, by the existence of the projections (2s, 2t, 2u, and 2v).

In the prior art, for example, the conventional technique in which a corrugated band having simple approximate sine wave form structure, and because both members (1 and 2) are joined over the area ($W_2$) using brazing filler metal and fillets of brazing filler metal are formed around the contact, the conventional technique requires much consumption of expensive brazing filler metal. Further, in the prior art, forming of fillets of wash coating material at and around contact area between both members when wash coating layer is formed on the surface of both members (1 and 2) of the area ($W_2$) for carrying exhaust gas cleaning catalyst (Pt, Rh, or Pd) results in additional requirement of expensive catalyst metal.

As described above, the realization of noncontact relationship between both members (1 and 2) in the area ($W_2$) has important significance.

The corrugated member (2) for realization of noncontact relationship between both members (1 and 2) in the area ($W_2$) may be manufactured according to a desired embodiment.

For example, a corrugated member (2) is manufactured by wave forming a planar member (1) using a forming gear (5) shown in FIG. 7.

In the forming gear (5) shown in FIG. 7, (51) is the section for forming approximate sine wave form (shown in the figure is delta wave), and (52) is the section for forming rectangular wave form.

FIG. 7, portions represented by 2s, 2t, 2u, and 2v are portions which project from the wave surface of approximate sine wave form in the view from the approximate sine wave form side (refer to FIG. 6).

In the manufacturing of the corrugated band member (2), needless to say, the equalization of extended length of the wave form (approximate sine wave form) to be in contact with a planar member (1) and the wave form (rectangular wave form) to be in noncontact with the planar member (1) to the same length favors easy wave forming preferably. Needless to say, the wave forming may be performed in one step or in multi-step.

In the manufacturing the corrugated band member (2), the wave form at the boundary between the approximate sine wave form and rectangular wave form (refer to 5a, 5b, and 5c portions in FIG. 7) may be sharply defined at the boundary between approximate sine wave form and rectangular wave form or may be gradually changed from the approximate sine wave form to rectangular wave form.

Further, in the corrugated band member (2) of the present invention, at least one of 5a, 5b, and 5c portions of the boundary areas in FIG. 7 may be perforated. For perforation at 5a, 5b, and 5c portions in FIG. 7, the portions may be perforated simultaneously when the corrugated band member (2) is wave-formed during manufacturing or may be perforated after the wave forming.

In the metal honeycomb core body (H) in accordance with the first embodiment of the present invention, the planar band member (1) has the approximately same width as the corrugated band member (2) in the view of the axial direction of the metal honeycomb core body (H) (refer to FIG. 3).

In the present invention, the metal honeycomb core body (H) is not limited to a metal honeycomb core body of which the planar band member (1) has the same width as the corrugated band member (2) as it is obvious from an embodiment described hereinafter.

In the present invention, the proportion of contact area ($W_1$ and $W_3$) at the area of both ends and near the ends of the corrugated band member (2) may be suitably prescribed according to the desired condition of the noncontact area ($W_2$). The front width ($W_1$) of the metal honeycomb core body (H) may be equal to the rear width ($W_3$), needless to say, or may be different from the rear width ($W_3$), for example, the relationship $W_1 > W_3$ may be applied for increased joining strength of the front portion.

The metal honeycomb core body (H) in accordance with the first embodiment of the present invention, namely the metal honeycomb core body (H) of rolling type shown in FIG. 1 and FIG. 2, is manufactured by well known method excepting the case in which the corrugated band member (2) having the above-mentioned particular structure is used.

In detail, planar band members (1) comprising a heat-resistant thin-walled steel sheet and corrugated band members (2) having the above-mentioned particular structure are superposed alternately, and rolled into a multilayered spiral form to fabricate the metal honeycomb core body (H) in accordance with the first embodiment of the present invention, and a number of network-patterned axial gas flow passages (cells) (3) for exhaust gas is naturally formed by the rolling forming.

The structure of the metal honeycomb core body (H) used as a component of a metal support (MS) in the present invention is not limited to the rolling type as it is described in embodiments hereinafter, the structure of different types may be used.

As for the configuration of the metal honeycomb core body (H) used as the principal element of a metal support (MS) of the present invention, the present invention is not limited to the circular front view (or cross-section) shown in FIG. 2.

For example, in use as an exhaust gas cleaning device of a motor vehicle, needless to say, the front view shape (or cross-section) of a metal honeycomb core body may be race track-shaped (extended circle), elliptical, polygonal such as triangular, or otherwise irregularly shaped.

the present invention, band material with a thickness of 30 $\mu$m to 100 $\mu$m used for manufacturing usual metal monolith type metal honeycomb core body, for example, chrome steel (chromium 13% to 25%), heat-resistant stainless steel having a composition of Fe—Cr(20%)—Al(5%), or heat-resistant stainless steel added with rare earth metal (REM such as Ce or Y) to the heat resistant stainless steel having the above-mentioned composition for improvement of high temperature oxidation resistance is used as the planar band member (1) and corrugated band member (2) used for fabricating the rolling type metal honeycomb core body (H) in accordance with the first embodiment.

In particular, the planar band member (1) and corrugated band member (2) containing Al, or those manufactured by depositing Al layer on the band members, heat-treating, and depositing alumina ($Al_2O_3$) layer thereon in whisker or mushroom configuration are preferably used. The alumina layer of, for example, whisker configuration is preferably employed because it serves to firmly support wash coating layer for carrying exhaust gas cleaning catalyst consisting of a metal such as Pt, Pd, or Rh.

The metal honeycomb core body (H) is to be accommodated and fixed in a metal-made casing (C) as shown in FIG. 1 and FIG. 2, and to be used as an exhaust gas cleaning metal support (MS).

The same heat resistant steel as used for both members (1 and 2) for fabricating the metal honeycomb core body (H) may be used as material for the metal-made casing (C). Alternatively, a metal-made casing (C) having heat and corrosion resistant double structure, namely a metal-made casing (C) comprising inside ferrite stainless steel and outside austenite steel, may be used.

Figure 8:
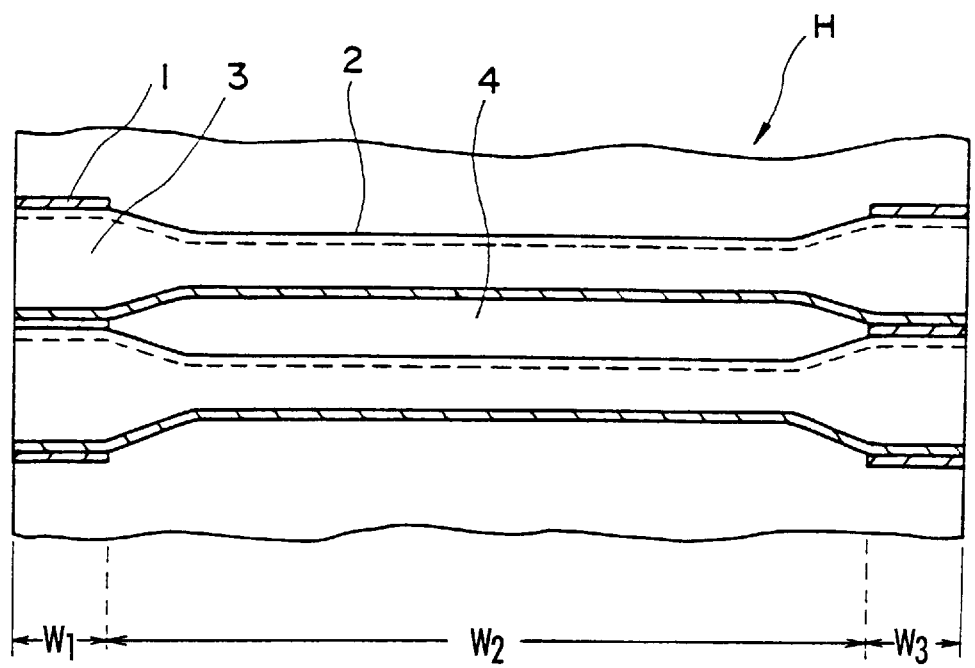
FIG. 8 is a cross-sectional view of a metal honeycomb core body (H) in accordance with the second embodiment of the present invention corresponding to FIG. 3.

FIG. 8 is a cross-sectional view in axial direction of the metal honeycomb core body (H) in accordance with the second embodiment of the present invention, which corresponds to FIG. 3 for illustrating the first embodiment.

The remarkable difference of the second embodiment from the first embodiment is the structure of the planar band member (1), and other factors are substantially the same.

The planar band member (1) is composed of strip members provided only on areas of both ends and near the ends ($W_1$ and $W_3$) of the corrugated band member (2). In detail, the planar band member (1) is composed of two strip members comprising a strip member with a width of $W_1$ and a strip member with a width of $W_3$. The planar band member (1) is not provided on the area ($W_2$) other than the above-mentioned areas ($W_1$ and $W_3$), the space (4) larger than that of the first embodiment is therefore formed.

Figure 9:
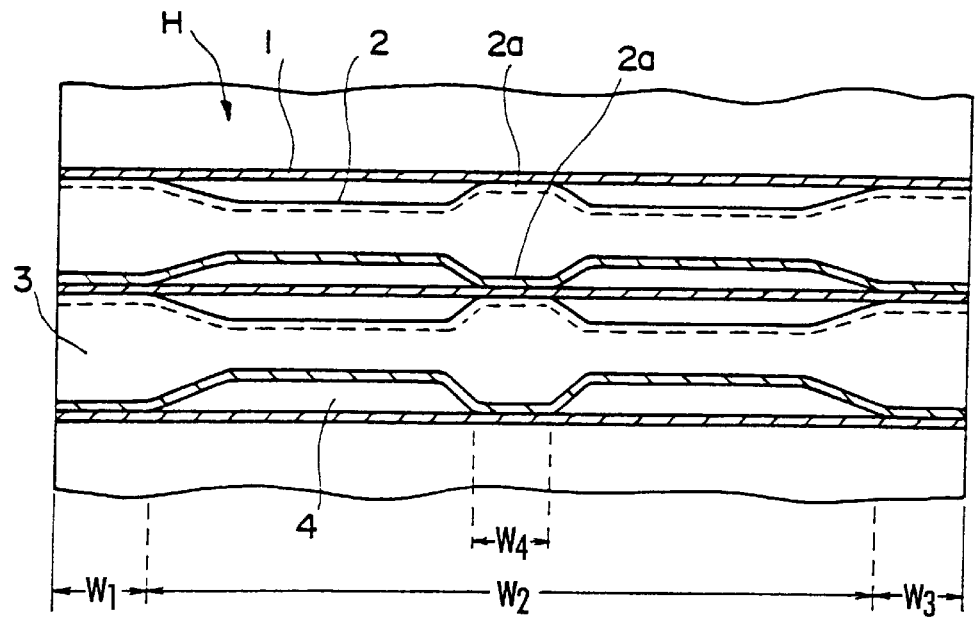
FIG. 9 is a cross-sectional view of a metal honeycomb core body (H) in accordance with the third embodiment of the present invention corresponding to FIG. 3.

FIG. 9 is a cross-sectional view in the axial direction of the metal honeycomb core body (H) in accordance with the third embodiment of the present invention, which corresponds to FIG. 3 for illustrating the first embodiment.

The remarkable difference of the third embodiment from the first embodiment is the structure of the corrugated band member (2). In detail, the corrugated band member (2) has a high wave form (2a) for contact with the planar band member (1) on the small area in the area $W_2$ (area other than the area of both ends and near the both ends of the corrugated band member).

In the present invention, the area size ($W_4$) of the wave form (2a) may be suitably prescribed within a range which exhibits the above-mentioned various effects. Generally to say, it is preferable to prescribe $W_4$ sufficiently small (small area) relatively to the area ($W_2$). The term "the corrugated band member is in noncontact with the planar band member on most area and in contact on small area in the area ($W_2$)" described in the present invention should be interpreted in the context of this meaning.

Figure 10:
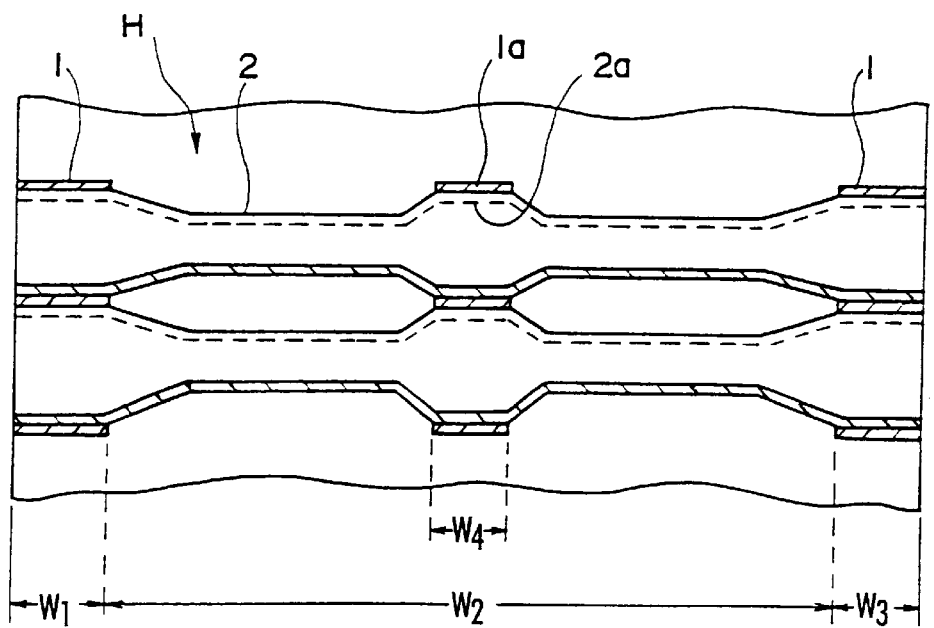
FIG. 10 is a cross-sectional view of a metal honeycomb core body (H) in accordance with the fourth embodiment of the present invention corresponding to FIG. 3.

FIG. 10 is a cross-sectional view in the axial direction of the metal honeycomb core body (H) in accordance with the fourth embodiment of the present invention, which corresponds to FIG. 3 for illustrating the first embodiment.

The fourth embodiment is remarkably different from the first embodiment in that the corrugated band member (2) is composed of an area ($W_4$) which have high wave form (2a) for contact with the planar band member (1) in the same way as in the third embodiment on the small area in the area ($W_2$) (the area other than the area of both ends and near the ends) and the planar band member (1) is composed of three strip members (1, 1, and 1a) with an approximately equal width provided on the areas ($W_1$, $W_3$) of both ends and near the ends (2) and on the area ($W_4$) of the wave form (2a) of the corrugated band member (2).

Figure 11:
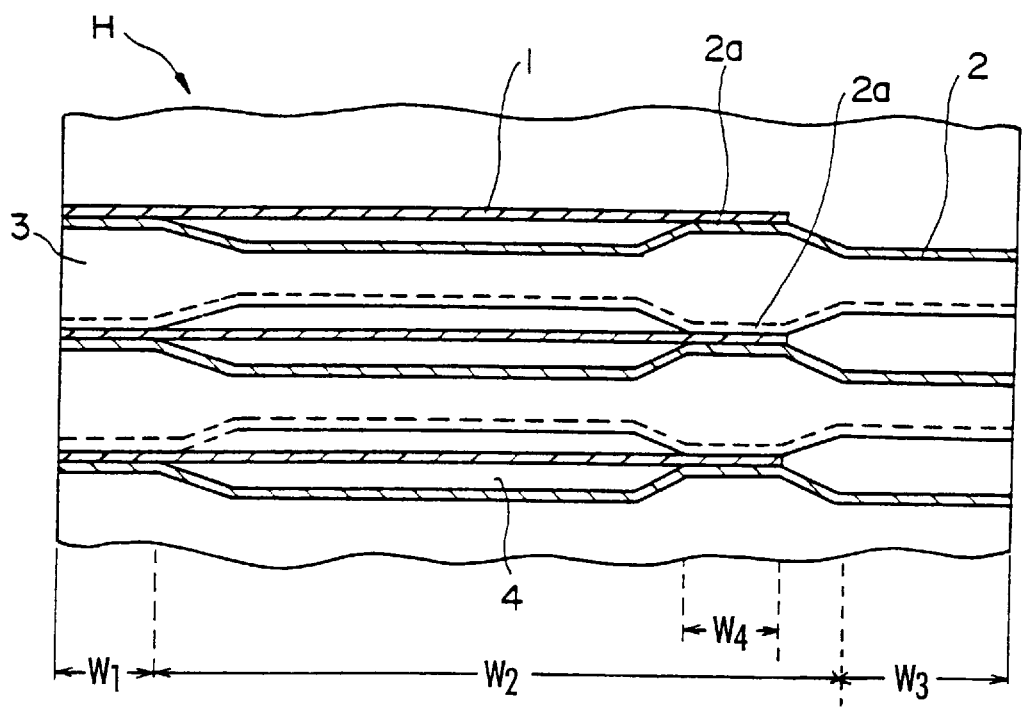
FIG. 11 is a cross-sectional view of a metal honeycomb core body (H) in accordance with the fifth embodiment of the present invention corresponding to FIG. 3.

FIG. 11 is a cross-sectional view in the axial direction of the metal honeycomb core body (H) in accordance with the fifth embodiment of the present invention, which corresponds to FIG. 3 for illustrating the first embodiment.

The fifth embodiment is featured in that, addressing on both ends of the metal honeycomb core body (H), the planar band member (1) is in noncontact with the corrugated band member (2) at one end differently from the above-mentioned embodiments (first to fourth).

In detail;

the corrugated band member (2) is in contact with the planar band member (1) at one end ($W_1$) but in noncontact at the other end ($W_3$), and the corrugated band member (2) has high wave form (2a) for contact with the planar band member (1) on the small area ($W_4$) in the area ($W_2$) (the area other than the area of both ends and near the ends), and on the other hand, the planar band member (1) is composed of a wide strip material extending from the area $W_1$ to the area ($W_4$) and is in noncontact with the corrugated band member (2) on the area ($W_3$).

Because the other end ($W_3$) of the corrugated band member (2) is in noncontact with the planar band member (1) and provided with forming of the space (4), namely an open end, the absorption and relaxation capability of thermal stress are enhanced at the above-mentioned other end.

In the present invention, various modifications can be applied for the above-mentioned area ($W_2$) (the area other than the area of both ends and near the ends) of the structure of the corrugated band member (2).

For example, needless to say, in addition to the embodiment having one area of wave form (2a) for contact with the planar band member (1) shown in the third and fourth embodiments in the area ($W_2$), an embodiment having a plurality of such areas may be possible. Further needless to say, the planar band member (1) may be composed of a plurality of strip members in accordance with the number of areas ($W_4$) of the wave form (2a) in the above-mentioned modified embodiments. Further yet needless to say, the width of the plurality of planar strip members may be identical with the width of the area ($W_4$) of the wave form (2a), or may be different from the width of the area ($W_4$), for example, the width covering two areas ($W_4$).

Next, an embodiment using the planar band member (1) composed of a member having the structure comprising the arrangement of successive approximately regular triangles in the longitudinal direction (in the direction perpendicular to the axial direction of the metal honeycomb core body (H)) in which the two sides are coterminous respectively and the residual one side forms a top or bottom flat apical plate is shown.

The planar band member (1) which is a component of the metal honeycomb core body (H) of the present invention comprises a member which has flat portion for partial contact with the corrugated band member (2) having particular structure as shown in the above-mentioned first to fifth embodiments in the view of the axial direction of the metal honeycomb core body (H).

Accordingly, because the member formed of the structure having arranged successive approximately regular triangles and top and bottom flat apical plates can be in contact with the corrugated band member (2) having the above-mentioned particular structure at the apical plate areas, the member is included in the planar band member (1) defined in the present invention.

The planar band member (1) having successive approximately regular triangles and top and bottom flat apical plates (top and bottom parallel apical plates) is referred to as "successive approximately regular triangle planar band member (1)" hereinafter in the description.

FIG. 12 to FIG. 18 are diagrams for illustrating the metal honeycomb core body (H) in accordance with the sixth embodiment of the present invention.

Figure 12:
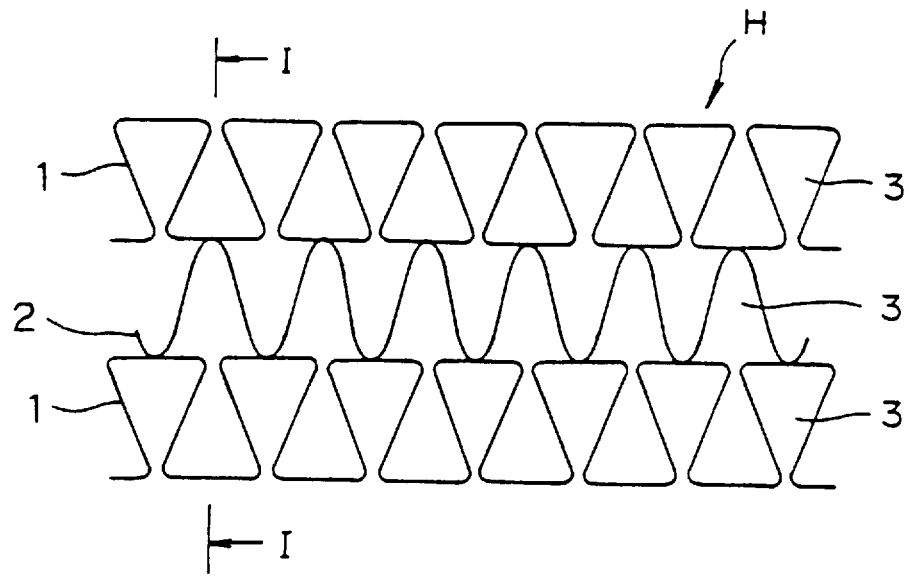
FIG. 12 is a partially enlarged front view of a metal honeycomb core body (H) in accordance with the sixth embodiment of the present invention.
Figure 18:
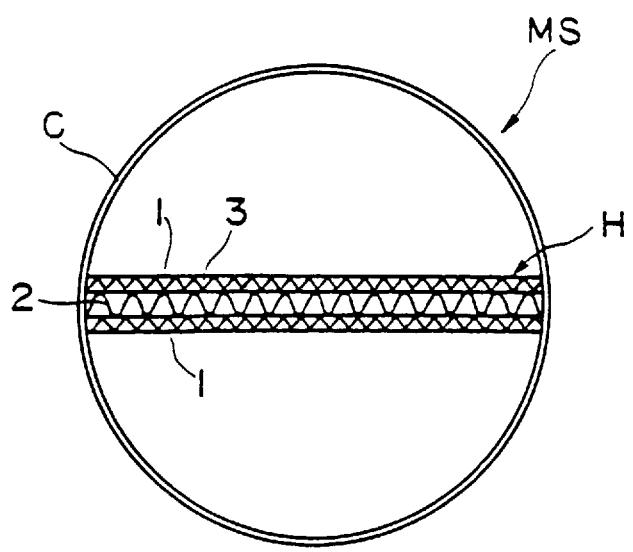
FIG. 18 is a front view of a metal support (MS) manufactured using the metal honeycomb core body (H) (multilayered type) in accordance with the sixth embodiment shown in FIG. 12.

FIG. 12 is a partial front view of the metal honeycomb core body (H) in accordance with the sixth embodiment composed of the successive approximately regular triangle planar band member (1) and corrugated band member (2). The metal honeycomb core body (H) in accordance with the sixth embodiment has the structure of multilayered type as shown in FIG. 18 described hereinafter.

Figure 13:
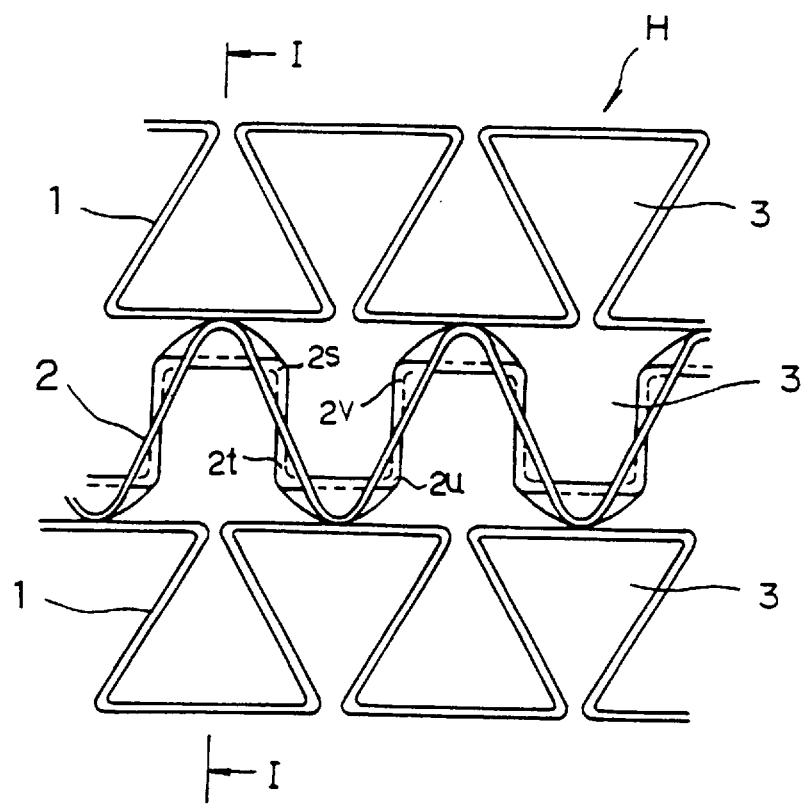
FIG. 13 is a partially enlarged front view of FIG. 12 for illustrating the structure of a planar member (1) having a successive approximately regular triangle structure and corrugated member (2).

FIG. 13 is a partially enlarged front view of the metal honeycomb core body (H) in accordance with the sixth embodiment, which corresponds to a partially enlarged detailed view of FIG. 1. As shown in FIG. 13, the structure of the corrugated band member (2) is quite same as that of the corrugated band member (2) used in the first embodiment (refer to FIG. 6 for description of the first embodiment).

Figure 14:
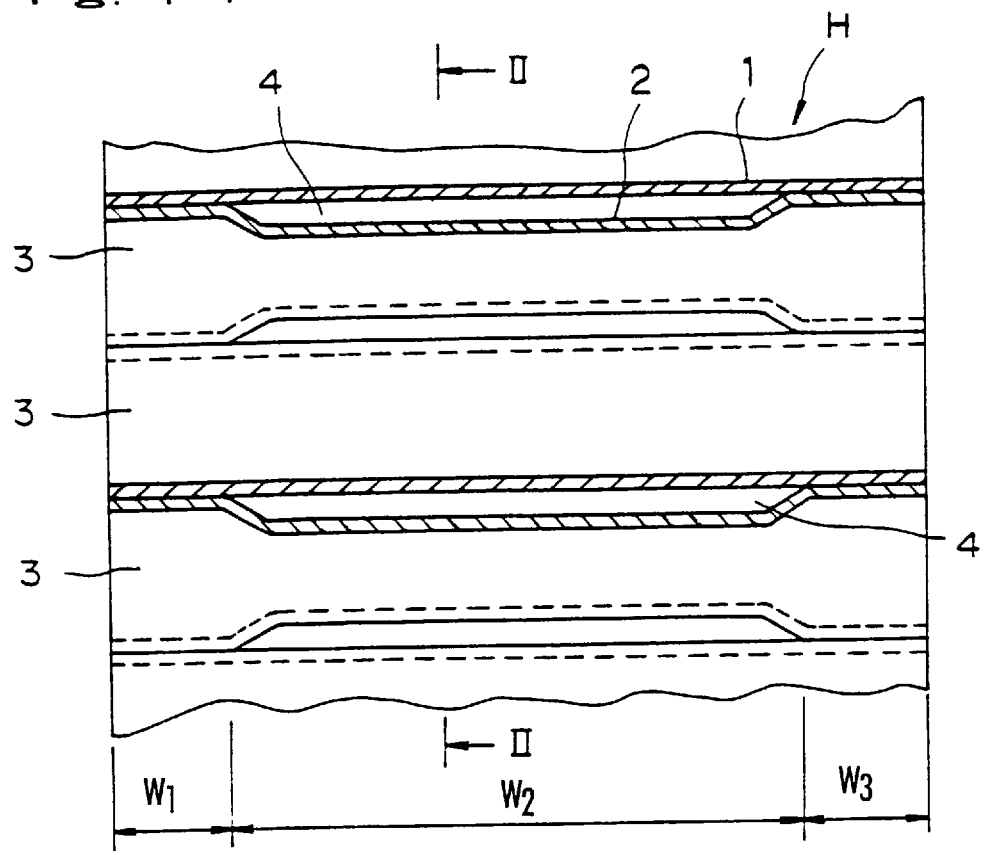
FIG. 14 is a cross-sectional view along the line I—I in FIG. 12 and FIG. 13.
Figure 15:
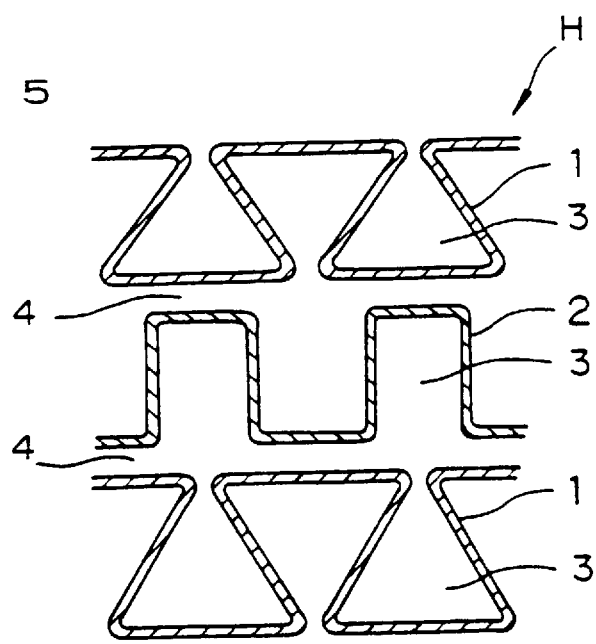
FIG. 15 is a cross-sectional view along the line II—II in FIG. 14.

FIG. 14 is a cross-sectional view along the line I—I in FIG. 12 and FIG. 13, namely, a cross-sectional view in axial direction of the metal honeycomb core body (H) in accordance with the sixth embodiment. FIG. 15 is a cross-sectional view along the line II—II in FIG. 14.

Figure 16:
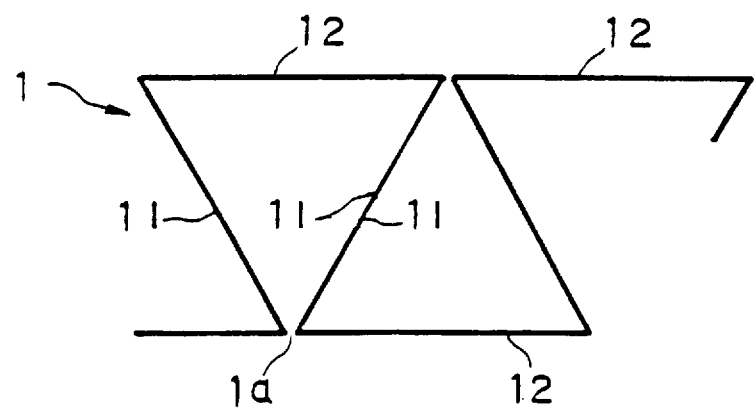
FIG. 16 is a diagram for illustrating the structure of the planar member (1) in FIG. 12.
Figure 17A:
FIG. 17 is a diagram for illustrating the manufacturing method of planar members (1) shown in FIG. 12.

FIG. 16 is a diagram for illustrating the structure of the successive approximately regular triangle planar band member (1), and FIGS. 17(a), and (b) are diagrams for illustrating the manufacturing method of the successive approximately regular triangle planar member (1).

FIG. 18 is a partially omitted front view of a metal support (MS) fabricated by inserting and fixing the metal honeycomb core body (H) manufactured in accordance with the sixth embodiment into a metal made casing (C).

The wave form structure of the corrugated member (2) which is a component of the metal honeycomb core body (H) in accordance with the sixth embodiment of the present invention, particularly in specification in terms of contact relationship between the successive approximately regular triangle planar member (1) and the corrugated member (2) as shown in FIG. 14, in view of the axial direction of the metal honeycomb core body (H), has;

(i) a structure having wave height for contact with the successive approximately regular triangle planar member (1) on the area of both ends and near the ends namely areas $W_1$ and $W_3$ in FIG. 14, and having approximate sine wave form, and (ii) a structure having wave height for noncontact with the successive approximately regular triangle planar member (1) on the area other than the area of both ends and near the ends namely in the area $W_2$ in FIG. 14, and having rectangular wave form.

In other words, the structure of the corrugated member (2) used for the metal honeycomb core body (H) in accordance with the sixth embodiment has the quite same structure as that used in the first embodiment (refer to FIG. 3).

Therefore, the corrugated member (2) may be manufactured using the forming gear (5) shown in FIG. 7 in the same way as described in the description of the metal honeycomb core body (H) in accordance with the first embodiment.

The areas $W_1$, $W_2$, and $W_3$ should be interpreted to have the widths of $W_1$, $W_2$, and $W_3$.

Next, the structure of a structural element of the metal honeycomb core body (H) in accordance with the sixth embodiment of the present invention, namely, the successive approximately regular triangle planar member (1) is described herein under.

FIG. 16 is an enlarged front view of the successive approximately regular triangle planar member (1).

As shown in the figure, the planar member (1) comprises successive approximately regular triangles each of which is the connecting unit (smallest repeating unit) arranged in the longitudinal direction connected in the manner that the two sides (11 and 11) are coterminous.

The residual side (12) forms a parallel apical plate above or below the two sides (11 and 11) according to the mode of the connection.

In the successive approximately regular triangle planar member (1) of the present invention, the distance of the vertex (1a) of the approximately regular triangle located on the top or bottom parallel apical plate is prescribed so that the vertex (peak and trough of the wave) does not fall down, but it is preferable to maintain in closed condition as close as possible.

In the metal honeycomb core body (H) in accordance with the sixth embodiment of the present invention, the successive approximately regular triangle planar member (1) is the significant member for rendering the rigid structure or flexible structure to the metal honeycomb core body (H).

Figure 17B:
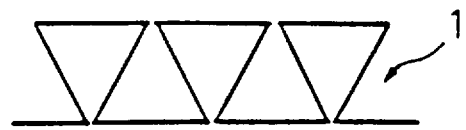

FIG. 17 is a diagram for description of manufacturing process of the successive approximately regular triangle planar member (1), a corrugated band having rectangular wave form is formed in (a) process, and then pressed in horizontal direction to form continuous approximately regular triangle structure in (b) process.

In the successive approximately regular triangle planar member (1) of the present invention, "approximately regular triangle" is not limited to "regular triangle", and should be interpreted widely to include, for example, an isosceles triangle. Essentially to say, "approximately regular triangle" should be interpreted to include all connected triangular structure which forms top and bottom parallel apical plates.

Figure 19:
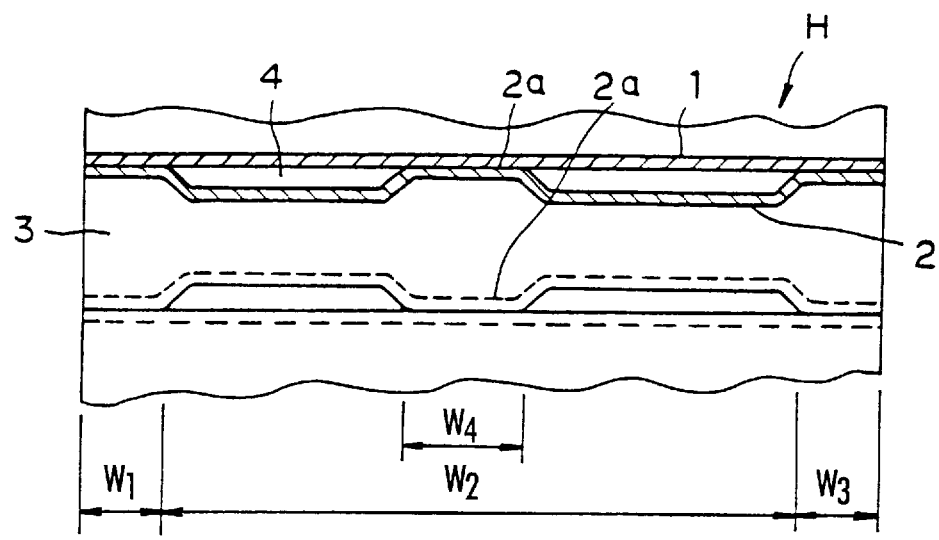
FIG. 19 is a cross-sectional view of a metal honeycomb core body (H) in accordance with the seventh embodiment of the present invention corresponding to FIG. 14.

FIG. 19 is a cross-sectional view in the axial direction of the metal honeycomb core body (H) in accordance with the seventh embodiment of the present invention, which corresponds to FIG. 14 for illustrating the sixth embodiment. As the metal honeycomb core body (H) used in the seventh embodiment, the same successive approximately regular triangle planar band member (1) as used in the sixth embodiment is used.

The seventh embodiment is remarkably different from the sixth embodiment in the structure of the corrugated member (2). In detail, on the small area of the area ($W_2$) (the area other than the area of both ends and near the ends of the corrugated member (2)), the corrugated member (2) has the high wave form (2a) for contact with the successive approximately regular triangle planar member (1).

In the present invention, the size of the formed area ($W_4$) of the wave form (2a) may be prescribed suitably. Generally, the area ($W_4$) is prescribed to be sufficiently small relatively to the area ($W_2$).

Figure 20:
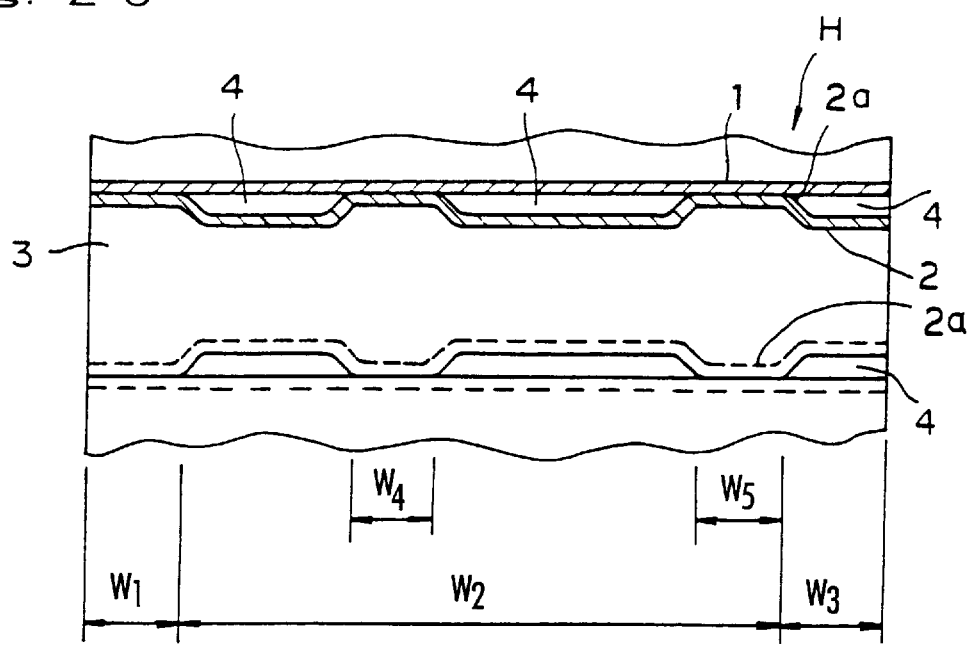
FIG. 20 is a cross-sectional view of a metal honeycomb core body (H) in accordance with the eighth embodiment of the present invention corresponding to FIG. 14.

FIG. 20 is a cross-sectional view in the axial direction of the metal honeycomb core body (H) in accordance with the eighth embodiment of the present invention, which corresponds to FIG. 14 for illustrating the sixth embodiment. As the metal honeycomb core body (H) used in the eighth embodiment, the same successive approximately regular triangle planar band member (1) as used in the sixth embodiment is used.

The eighth embodiment is remarkably different from the sixth and seventh embodiments in that one end of the two ends of the metal honeycomb core body (H) has noncontact structure. In detail, the corrugated member (2) is in contact with the successive approximately regular triangle planar member (1) at one end ($W_1$), but in noncontact with the successive approximately regular triangle planar member (1) at the other end ($W_3$), and the corrugated member (2) has the structure of high wave form (1a) for contact with the successive approximately regular triangle planar member (1) at two small areas ($W_4$ and $W_5$) in the area ($W_2$) (the area other than the area of both ends and near the ends).

In the eight embodiment, the other end ($W_3$) of the corrugated member (2) is in noncontact with the successive approximately regular triangle planar member (1), and provided so as to form the space (4), that is, the other end ($W_3$) is an open end, such structure renders the enhanced thermal stress absorbing and relaxation capability at the area ($W_3$) to the metal honeycomb core body (H).

In the sixth to eighth embodiments which use the successive approximately regular triangle planar member (1) as the planar member (1) of the present invention, variously modified structure of the corrugated member (2) in the area ($W_2$) (the area other than the area of both ends and near the ends) may be made.

For example, as long as the condition that the contact area proportion between the corrugated member (2) and the planar member (1) in the area ($W_2$) is sufficiently small (small area) relatively to the whole area ($W_2$) is satisfied in view of absorption and relaxation of thermal stress, the present invention is not limited to one contact area ($W_4$) as described in the seventh embodiment and two contact areas ($W_4$ and $W_5$) as described in the eighth.

The width of the contact areas ($W_4$, $W_5$ . . . ) in the view of the axial direction may be identical or may be different each other.

Variously modified examples may be incorporated into the structure of the metal honeycomb core body (H) of the present invention.

First, the planar member (1) of the present invention is not limited to the simple flat planar band member as used in the first to fifth embodiments. In the present invention, needless to say, the structure which favors mixing, agitating, and disturbing exhaust gas in the metal honeycomb core body (H) may be incorporated into the planar member (1).

A planar band member such as punching metals and expanded metals having holes, pulled-up cuts, or holes and projections may be used as the planar member (1) of the sort. Otherwise, a mesh sheet (wire screen) which is manufactured by weaving metal wires may be used as the planar member (1). Further, a planar band member having microwave form (microwave, micro-corrugation) structure may be used as the planar member (1).

Needless to say, the corrugated member (2) having particular structure may be manufactured from the planar member (1) which is provided with the above-mentioned means to favor mixing, agitating, and disturbing exhaust gas.

FIG. 21 to FIG. 24 illustrate the modified examples of the planar member (1).

Figure 21:
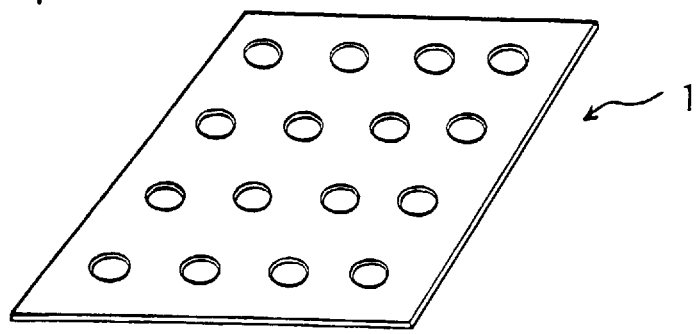
FIG. 21 is a diagram for illustrating a modified example of the planar member (1) perforated planar member).
Figure 22:
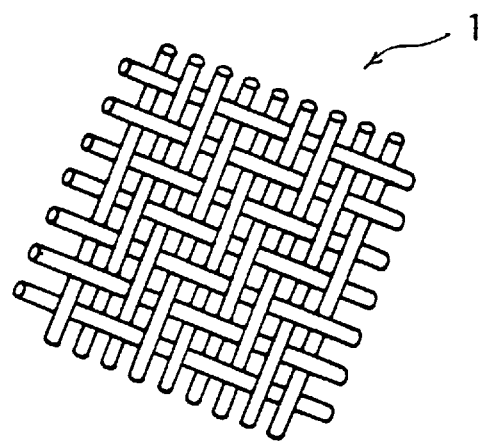
FIG. 22 is a diagram for illustrating a modified example of the planar member (1) (mesh sheet).
Figure 23:
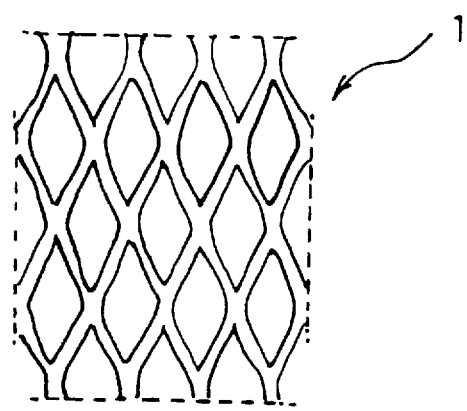
FIG. 23 is a diagram for illustrating a modified example of the planar member (1) (expanded metal).
Figure 24:
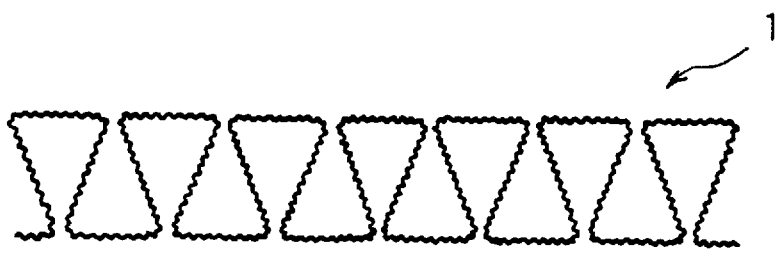
FIG. 24 is a diagram for illustrating a modified example of the planar member (1) (microwave, micro-corrugation).

FIG. 21 shows a punching planar sheet (punching metal), FIG. 22 shows a mesh sheet, FIG. 23 shows an expanded metal, and FIG. 24 shows a modified example of the successive approximately regular triangle planar member (1) used in the sixth to eighth embodiments having microwave form structure (micro-corrugation).

Next, the structure of the metal honeycomb core body (H) of the present invention is not limited to the rolling type (refer to FIG. 1 and FIG. 2) and multilayered type (refer to FIG. 18). Needless to say, any structure that is well known in the art may be used as the metal honeycomb core body (H).

Figure 25:
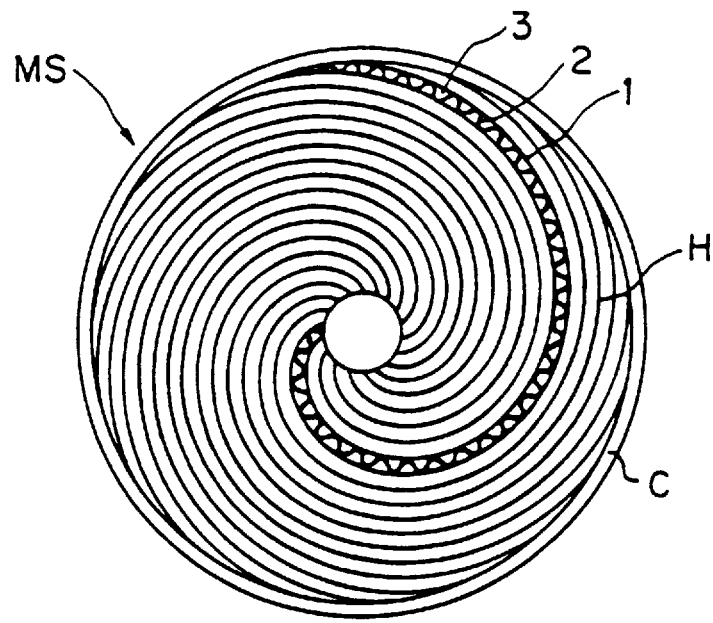
FIG. 25 is a diagram for illustrating a modified example of the metal honeycomb core body (H) (radial type).
Figure 26:
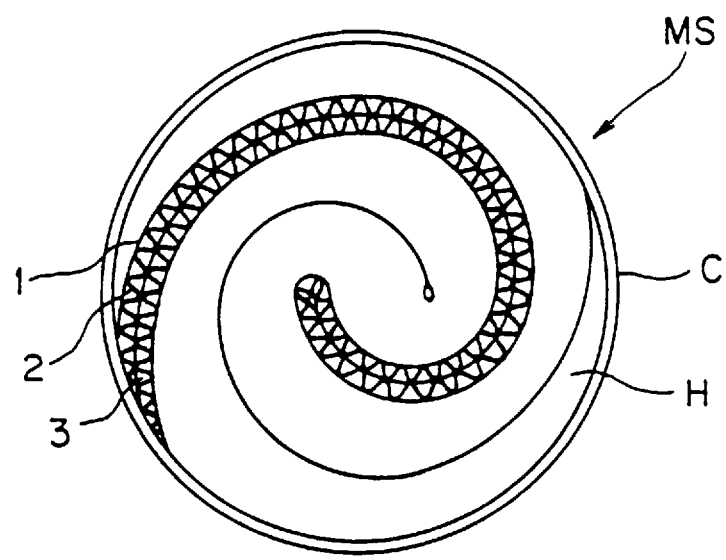
FIG. 26 is a diagram for illustrating a modified example of the metal honeycomb core body (H) (S-shaped type).
Figure 27:
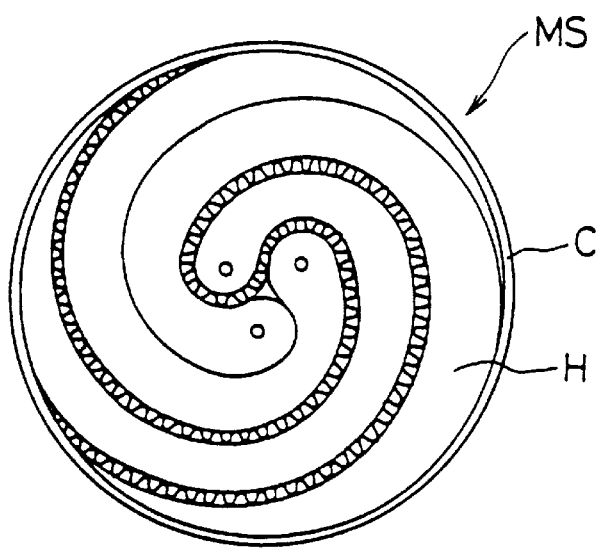
FIG. 27 is a diagram for illustrating a modified example of the metal honeycomb core body (H) (conjugated-comma type).
Figure 28:
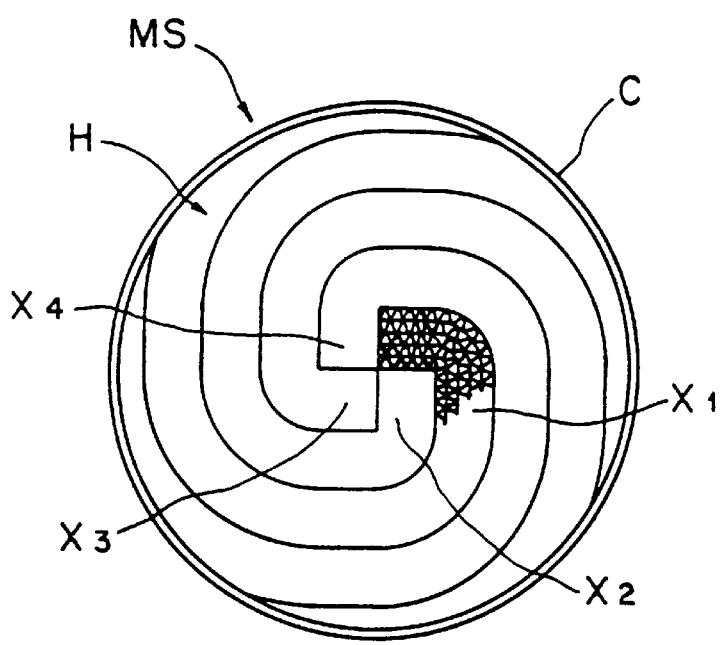
FIG. 28 is a diagram for illustrating a modified example of the metal honeycomb core body (H) (X-lap type).

For example, as for the structure of the metal honeycomb core body (H), FIG. 25 shows a radial type, FIG. 26 shows a S-shaped type, FIG. 27 shows a conjugated-comma type, and FIG. 28 shows an X-lap type. Needless to say, the metal honeycomb core body (H) of the present invention may have any structure of the above-mentioned various structures.

The above-mentioned metal honeycomb core body (H) having various structure may be fabricated as described herein under.

The metal honeycomb core body (H) of radial type shown in FIG. 25 is fabricated by a way in which one end of the cleaning element is fixed to the fixed axis (center axis) and each cleaning element is extended outward from the fixed axis (radiated) using a number of the planar member (1) and the corrugated member (2) required for fabrication of a cleaning element.

For clear understanding of the figure, the cleaning element is shown only partially.

The metal honeycomb core body (H) of S-shaped type or conjugated-comma type shown in FIG. 26 and FIG. 27 is fabricated as described herein under.

In detail, the metal honeycomb core body (H) is fabricated using desired number of stacks formed by placing the planar member (1) and the corrugated member (2) alternately to desired number of steps, and the metal honeycomb core body (H) of the structure in which both ends of the planar band members (1) and corrugated band members (2) of each stack are in contact with the inside wall of the metal-made casing for containing in the internal thereof.

In the above-mentioned fabrication, if one stack is used, the metal honeycomb core body (H) of S-shaped type that structural members are bent in S-shaped at the center as shown in FIG. 26, and if three stacks are used, the metal honeycomb core body (H) of conjugated-comma type that three stacks are conjugated spirally at the center as shown in FIG. 27 are obtained. In the figures, for clear understanding of the figures, members (1 and 2) are shown only partially.

The metal honeycomb core body (H) of X-lap type shown in FIG. 28 is fabricated by a way in which four stacks ($X_1$ to $X_4$), each stack is formed by placing the planar member (1) and the corrugated member (2) alternately to a desired number of steps are used, one-ends of these stacks are brought into a contact at the contact areas, and the stacks are rolled in the same direction around the contact ends at the center, the metal honeycomb core body (H) thus has the structure that one-end of each planar member (1) and the corrugated member (2) of each stack is in contact with the inside wall of a metal-made casing for containing the metal honeycomb core body (H). In the above-mentioned manufacturing method, because stacks are combined in X-shaped configuration (in a cross-shaped) at the center of the metal honeycomb core body (H) and rolled around the center, this type of metal honeycomb core body (H) is called as X-lap type. For clarifying the figure, bands (1 and 2) are shown only partially.

What is claimed is:

1. A metal honeycomb core body comprising:
    a planar sheet made of a heat resistant metal; and
    a corrugated sheet made of heat-resistant metal disposed against said planar sheet, said planar sheet and said corrugated sheet being arranged in a manner to form said metal honeycomb core body and to conduct a flow of exhaust gas in an axial direction through said metal honeycomb body from an inlet end to an outlet end thereof;
    a first essentially sinusoidal wave-shaped portion of the corrugated sheet which has a wave height selected to contact a first portion of said planar sheet proximate one of the inlet end and the outlet end, and
    a second rectangular wave-shaped portion of the corrugated sheet which has a wave height less than that of said first essentially sinusoidal wave-shaped portion, and which has a non-contact relationship with said planar sheet, said second rectangular wave-shaped portion having four corners that respectively form four projection portions which project out beyond a sinusoidal wave form of said first sinusoidal wave-shaped portion to project into and disturb the gas flow passing from the inlet end to the outlet end of said metal honeycomb core body and to increase the contact efficiency between the gas and at least one of said planar sheet and said corrugated sheet.

2. A metal honeycomb core body as claimed in claim 1, wherein said planar sheet comprises a continuous flat sheet.

3. A metal honeycomb core body as claimed in claim 2, wherein said flat sheet is perforate.

4. A metal honeycomb core body as claimed in claim 2, wherein said flat sheet is formed of a mesh.

5. A metal honeycomb core body as claimed in claim 1, wherein said planar sheet is folded to form a plurality of alternatingly inverted triangular openings wherein side portions of the triangular openings are coterminous and residual side portions of alternate other triangular openings are separated by a vertex gap portion of a triangular opening located therebetween.

6. A metal honeycomb core body as claimed in claim 5, wherein the vertex gap portions are such that alternate residual side portions juxtapose one another in a spaced, essentially aligned, contiguous manner.

7. A metal honeycomb core body as claimed in claim 1, wherein said planar sheet is folded into a square wave configuration.

8. A metal honeycomb core body as claimed in claim 1, wherein said planar sheet has a width, in the axial direction, which is approximately equal to that of said corrugated sheet.

9. A metal honeycomb core body as claimed in claim 1, wherein said planar sheet comprises a flat sheet member having a width approximately equal, in the axial direction, to that of the portion of said corrugated sheet that is in contact with said planar sheet.

10. A metal honeycomb core body having an inlet end and an outlet end, comprising:
   a planar sheet made of heat-resistant metal and adapted to carry an exhaust gas cleaning catalyst; and
   a corrugated sheet made of heat-resistant metal and adapted to carry an exhaust gas cleaning catalyst, said planar sheet and said corrugated sheet being overlaid one on the other and adapted to direct a flow of exhaust gas in an axial direction from the inlet end to the outlet end, said corrugated sheet including:
      a first portion having a first essentially sinusoidal wave form and a first wave height sufficient to contact and engage said planar sheet proximate one of the inlet end and the outlet end; and
      a second portion contiguous with said first portion and having a second square wave form having a wave height insufficient to contact said planar sheet, said second portion having an area which is larger than an area of said first portion, the square wave form of said second portion producing projections which project out from the sinusoidal wave form corrugations of said first portion, said projections disturbing a gas flow passing from the inlet end to the outlet end of said metal honeycomb core body and increasing the contact efficiency between the gas and catalyst carried on at least one of said at least one planar member and said corrugated member.

11. A metal honeycomb core body as claimed in claim 10, wherein said first wave form has sharp peaks and assumes an essentially delta wave-like form.

12. A metal honeycomb core body as claimed in claim 10, further comprising a third portion having the first sinusoidal wave form and the first wave height which contacts said planar sheet proximate the other of the inlet end and the outlet end.

13. A metal honeycomb core body as claimed in claim 10, wherein said planar sheet has a width approximately equal to the width of said corrugated sheet in the axial direction of said metal honeycomb core body.

14. A metal honeycomb core body as claimed in claim 10, wherein said planar sheet comprises a sheet having a width approximately equal to the width of the first portion of said corrugated member in the axial direction of said metal honeycomb core body.

15. A metal honeycomb core body as claimed in claim 10, wherein said planar sheet is folded into a square wave configuration.

16. A metal honeycomb core body as claimed in claim 10, wherein said planar sheet is perforate.

17. A metal honeycomb core body as claimed in claim 10, wherein said planar sheet is formed of a mesh.

18. A metal honeycomb core body as claimed in claim 10, wherein said planar sheet comprises a sheet which is folded to form a series of alternatingly inverted triangular openings wherein side portions are coterminous and residual side portions of alternate triangular openings are separated by a vertex portion of a triangular opening located therebetween, and wherein the vertex portions are such that alternate residual side portions have a spaced, essentially aligned, contiguous relationship.

19. A metal honeycomb core body as claimed in claim 1 or claim 10, wherein said metal honeycomb core body is any type selected from rolling type, multi-layered type, radial type, S-shaped type, conjugated-comma type, and X-lap type.

* * * * *